May 30, 1939.  R. C. ENGELMAN  2,160,401
VALVE MECHANISM FOR COMPRESSORS
Filed Nov. 11, 1937   9 Sheets-Sheet 1

INVENTOR
Robert C. Engelman
BY
Louis Prevost Whitaker
ATTORNEY

May 30, 1939.  R. C. ENGELMAN  2,160,401
VALVE MECHANISM FOR COMPRESSORS
Filed Nov. 11, 1937  9 Sheets-Sheet 3

Fig:5.

May 30, 1939.  R. C. ENGELMAN  2,160,401
VALVE MECHANISM FOR COMPRESSORS
Filed Nov. 11, 1937   9 Sheets-Sheet 4

INVENTOR
Robert C. Engelman
BY
Louis Prevost Whitaker
ATTORNEY

Patented May 30, 1939

2,160,401

UNITED STATES PATENT OFFICE 2,160,401

VALVE MECHANISM FOR COMPRESSORS

Robert C. Engelman, Bradford, Pa., assignor, by mesne assignments, to Dresser Manufacturing Company, Bradford, Pa., a corporation of Pennsylvania Application November 11, 1937, Serial No. 173,957

23 Claims. (Cl. 230—228)

My invention consists in the novel features hereinafter described, reference being had to the accompanying drawings which illustrate one embodiment of the same, selected by me for purposes of illustration, and the said invention is fully disclosed in the following description and claims.

This invention relates to valve mechanisms for compressors and like apparatus, and more specifically to an improved automatic valve mechanism for highspeed gas compressors for handling large volumes of gas.

The invention is particularly adapted for use with radial compressors of the type employed on pressure "booster" stations on long natural gas transmission lines, although its use is not limited to such compressors. Compressors such as are used at booster stations are capable of handling approximately twenty-five million cubic feet of gas per day and may frequently operate at speeds of approximately one thousand revolutions per minute. Valves for such compressors must necessarily provide an exceptionally large port area per cylinder and yet be compact and simple in construction, in order to provide a maximum of efficiency with a minimum of weight and complexity. It is one of the principal objects of my invention to provide a novel structure of valve mechanism which will embody these advantageous features.

Another object of the invention is to provide a novel automatic strip or plate valve mechanism, the valve element of which may be made light in weight to insure instantaneous opening and closing at high speeds, with a minimum of breakage of valve strips or plates.

Another object of the invention is to provide a novel structure in which the strips are positioned and secured so as to be readily accessible for replacement in case of occasional breakage of a valve strip or plate, and to insure a minimum loss of operating time in effecting valve repair.

Another object of the invention is to provide a novel valve mechanism through which fluid may be admitted to or discharged from the cylinder without appreciable loss of efficiency due to leakage, friction or turbulence of the fluid. Other objects and advantages of the invention will appear in the course of the following description and claims.

Referring to the accompanying drawings, which form part of this specification:

Fig 15 is a partial plan view of the discharge valve seat.

Fig. 16 is a section thereof on line 16—16 of Fig. 15.

Fig. 17 is a partial section of the discharge valve seat on the line 17—17 of Fig. 15.

Fig. 18 is a partial section of the discharge valve seat on the line 18—18 of Fig. 15.

Fig. 19 is a partial section of the discharge valve seat on line 19—19 of Fig. 15.

Fig. 20 is an enlarged plan view of a portion of the discharge valve seat showing a discharge port.

Fig. 21 is a section on line 21—21 of Fig. 20.

Fig. 22 is a section on line 22—22 of Fig. 21.

In the accompanying drawings, 1 represents a compressor cylinder, provided with a water jacket 2, the upper portion of which, indicated at 2a, forms a casing for the valve mechanism for the cylinder. In the present instance the water jacket is provided with an exterior flange 2b, near its lower end supported upon the crank case 3 to which it is secured by bolts or cap screws 4. The upper end of the cylinder is provided with an outwardly extending flange 1a, which is supported on the annular shoulder 2c of the water jacket, the annular water space 5 being formed between the cylinder and jacket and maintained tight in any usual or well known manner, as indicated in the present instance by the gasket 6 between the parts 1a and 2c and the packing ring 6a, gland 7 and bolts 8 at the lower end of the jacket.

The water jacket 2 is also provided with an annular inlet passage 9 communicating with a main inlet 10 for gaseous material to be compressed or further compressed and an annular discharge passage 11 communicating with a main discharge passage 12.

Figure 28:
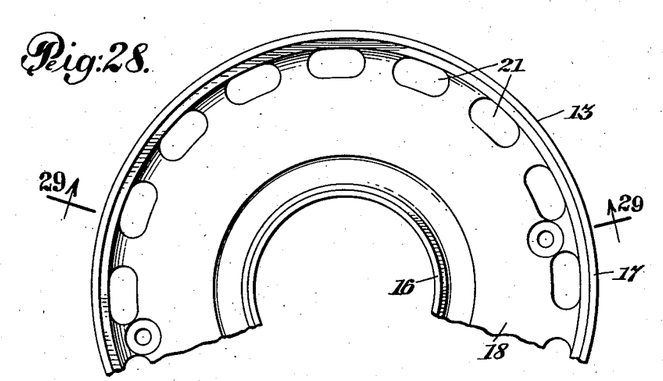
Fig. 28 is a partial plan view of the discharge valve support.
Figure 29:
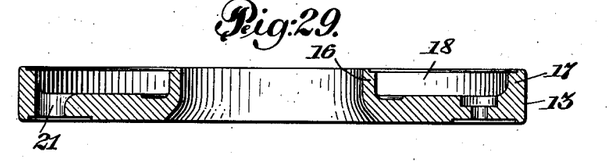
Fig. 29 is a sectional view of the same on line 29—29 of Fig. 28.

13 represents an annular discharge valve support (see Fig. 5) which is shown in detail in Figs. 28 and 29, which is supported upon the upper end of the cylinder 1, and is fastened thereto by an annular series of cap screws 14, suitable annular concentric gaskets 15, 15 being provided to prevent leakage between them. This discharge valve support comprises an annular plate having upwardly extending flanges 16 and 17 respectively at its inner and outer edges, forming between said flanges an annular channel 18. The central aperture in the plate forms a bore conforming to the shape of the head 19 of the piston 20, located in the cylinder 1, the piston head extending into said bore at the end of the out stroke of the piston. The said plate 13 is also provided with a circular series of outlet ports 21, which communicate with the annular discharge passage 11 and thence with the main discharge passage (see Fig. 5).

The upper edges of the inner and outer flanges 16, 17, are recessed to receive gaskets 22, 22, upon which rests the discharge valve seat 23 (see Fig. 5), which is shown in detail in Figs. 15 to 21 inclusive. This seat is provided with a circular series of radially disposed elongated slots or ports 24, which may be described roughly as funnel-shaped in vertical radial cross section, the inner end wall of each port being approximately vertical as at 24a (see Fig. 21) and the outward end wall extending downwardly and outwardly in an inclined direction, as indicated at 24b. The portions of the lower face of the plate 23 surrounding the lower enlarged ends of the discharge ports 24 form the seating surface, or seats for the radially disposed discharge plate valves 25, and when the valves are open said ports 24 communicate with the annular channel 18 and through ports 21 with the annular discharge passage 11 and main discharge passage 12.

Figure 35:
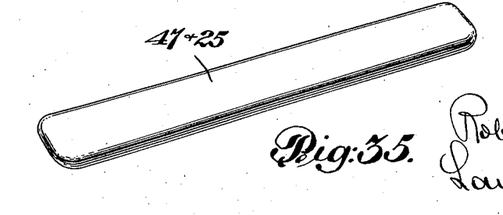
Fig. 35 is an enlarged perspective view of one of the plate or strip valves.

The plate valves 25 are flexible, being made of tempered spring steel, or other suitable material, and are positioned with respect to the ports 24, so as to normally engage the seats at the lower ends of said ports and seal them. The valves are held firmly at one end only so that they may yield away from their seats and these plate valves are preferably formed in reed shape, as shown in Fig. 35, to provide great flexibility and wide opening with minimum stress, and said valves are somewhat longer and wider than the lower ends of the ports 24 to provide adequate seating, and to prevent leakage, the edges of the valve strips being preferably rounded, as shown.

Figure 23:
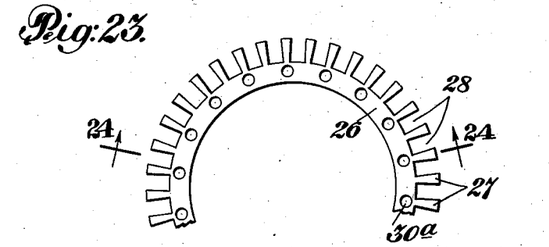
Fig. 23 is a partial plan view of the discharge valve spacer ring.
Figure 24:
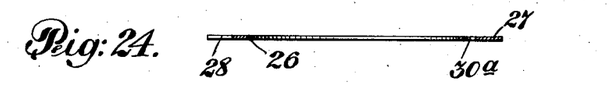
Fig. 24 is a sectional view of Fig. 23, on line 24—24 thereof.
Figure 25:
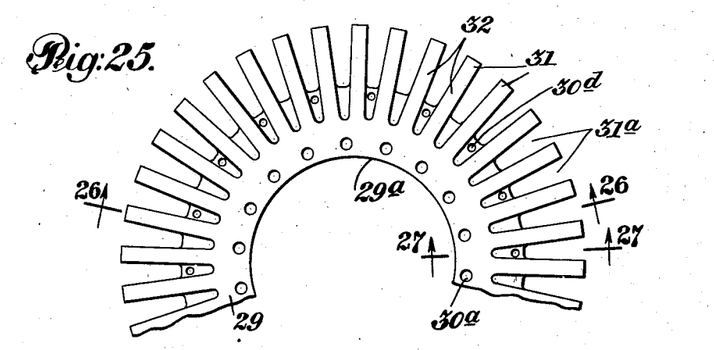
Fig. 25 is a partial plan view of the discharge valve keeper.
Figure 26:
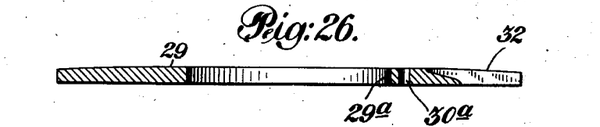
Fig. 26 is a sectional view thereof on line 26—26 of Fig. 25.
Figure 27:
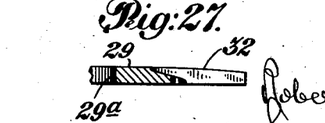
Fig. 27 is a partial section on line 27—27 of Fig. 25.

The valve strips 25 are positioned on their seats by means of a discharge valve spacer, preferably in the form of a ring 26 (shown in detail in Figs. 23 and 24) of slightly less thickness than the valve strips and having integral outwardly and radially projecting fingers 27, forming spaces 28 between them, of the correct width to receive the inner ends of the valve strips or plates, and position them with respect to the valve seats. The spacer ring 26 is held in place by a discharge valve keeper 29 shown in detail in Figs. 25, 26 and 27, suitable cap screws 30 extending upwardly through registering apertures 29a in the keeper and spacer and engaging threaded apertures 30b in the discharge valve seat. A second series of bolts 30c may connect the keeper and seat plate if desired, passing through apertures 30d in the keeper and engaging threaded apertures 30e in the discharge valve seat. The keeper plate is provided with an annular series of radial supporting fingers 31 one for each strip or valve, and located immediately below the strip, the upper surfaces of these valve supporting fingers having upper surfaces 32 against which the valves yield when open, curved approximately to the elastic curve which the strips or valves will assume when in open position, as clearly shown in Fig. 31. As the spacer is thinner than the valve strips, the tightening of the screws 30 and 30c will clamp each valve strip at its inner end in the position determined by the spaces 28 in the spacer ring 26.

Figure 5:
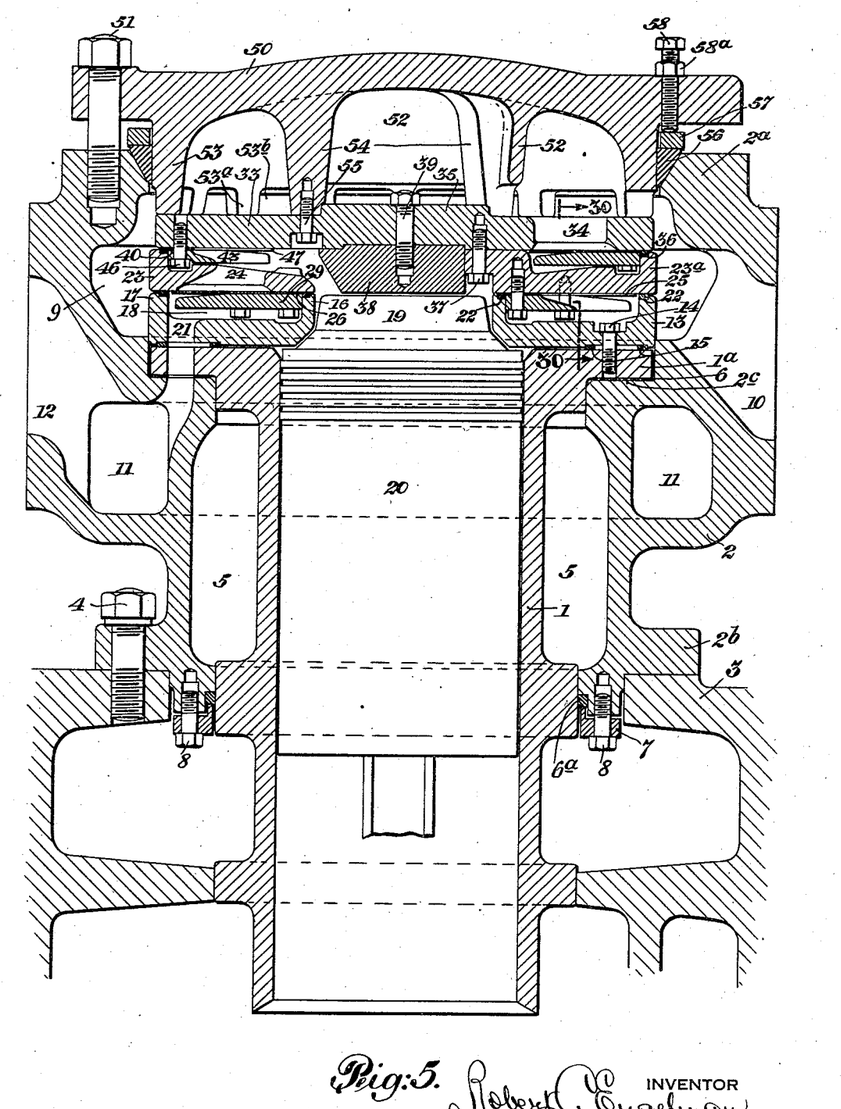
Fig. 5 is an enlarged vertical sectional view of the apparatus shown in Figs. 1 and 2, the remaining figures being drawn to the scale used in Fig. 5 except where otherwise noted.
Figure 6:
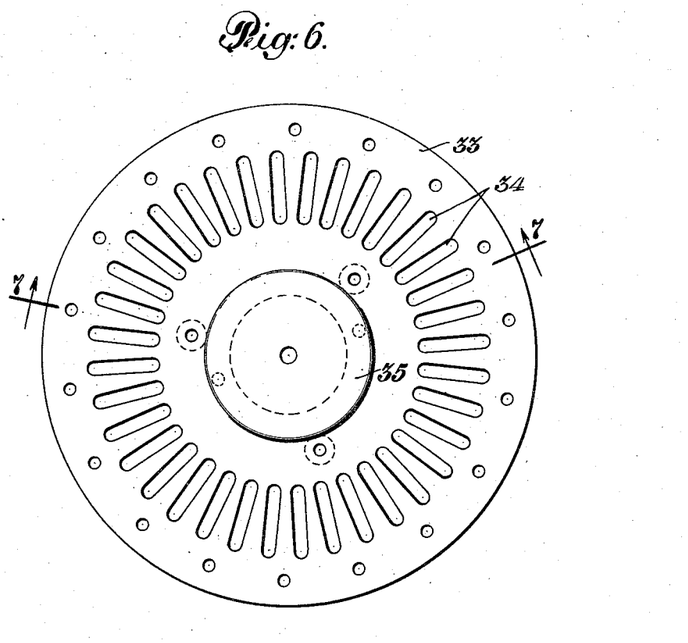
Fig. 6 is a plan view of the inlet valve seat.
Figures 7, 8, 9, 10:
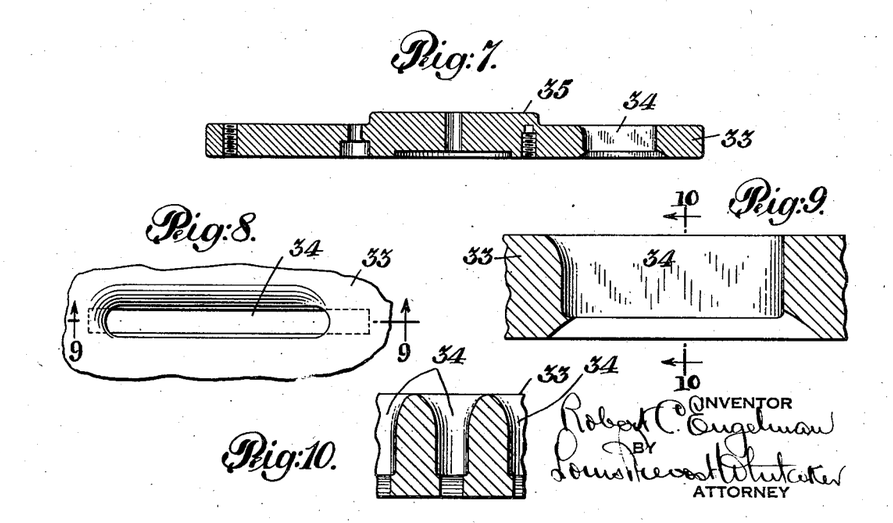
Fig. 7 is a vertical section of Fig. 6, on the line 7—7.
Fig. 8 is an enlarged partial plan view of a portion of said inlet valve seat showing one of the inlet ports.
Fig. 9 is a section on line 9—9 of Fig. 8.
Fig. 10 is a section on line 10—10 of Fig. 9.

The discharge valve assembly will be positioned accurately by reason of the fact that the central aperture 29a of the discharge valve keeper 29 fits over the inner vertical flange 16 of the discharge valve support, as clearly shown in Fig. 5, the keeper 29 being supported in the annular groove 18 of the discharge valve support.

The construction of the inlet valve assembly is generally similar to that of the discharge valve assembly, and the two are interconnected with each other and connected with the top cover, so that by removing the top cover the entire valve assembly for both inlet and outlet ports and passages can be removed from the valve casing 2a at the upper end of the water jacket 2 to facilitate the removal of a broken valve plate or plates in either assembly and its or their replacement by new valve plates, by simply loosening the respective keeper plates, after which the entire valve assembly can be restored with the top cover to its proper position, as hereinafter described.

The discharge valve seat 23 is provided at its outer edge with an upwardly extending flange 23a and is also provided adjacent to its inner edge with a series of brackets or lugs 23b and 23c the upper faces of which are slightly above the level of the upper edge of the flange 23a, as best shown in Figs. 15, 16 and 19.

33 represents the inlet valve seat (see Fig. 5) which is shown in detail in Figs. 6, 7, 8, 9 and 10. This seat comprises a circular plate or disc having a circular series of elongated radial inlet ports or slots 34, surrounding a circular centrally raised boss, indicated at 35. The inlet valve seat 33 rests upon an annular gasket 36 supported in a recess in the upwardly extending flange 23a, and the inlet valve seat is secured to the discharge valve seat 23 by cap screws 37 passing through apertures in the lugs 23b in the valve seat which draws the inlet valve seat down upon the supporting lugs 23b and 23c, the gasket 36 forming a gastight connection between the connected parts. A cylinder volume clearance plug, indicated at 38, is secured to the central portion of the lower face of the inlet valve seat by means of a bolt or cap screw 39.

Figures 11, 12:
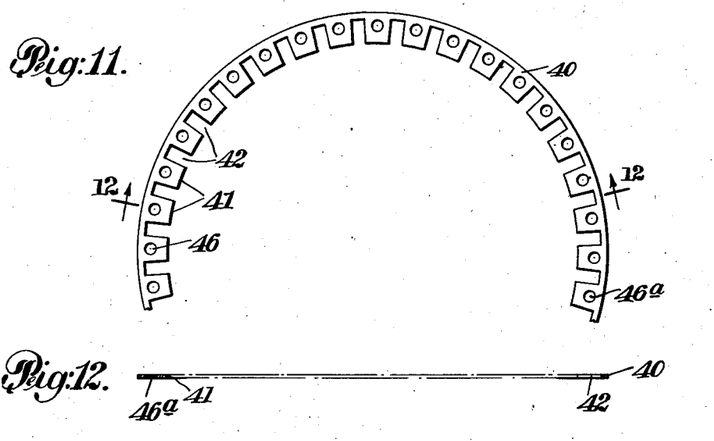
Fig. 11 is a partial plan view of the inlet valve spacer ring.
Fig. 12 is a section of Fig. 11, on the line 12—12.
Figure 13:
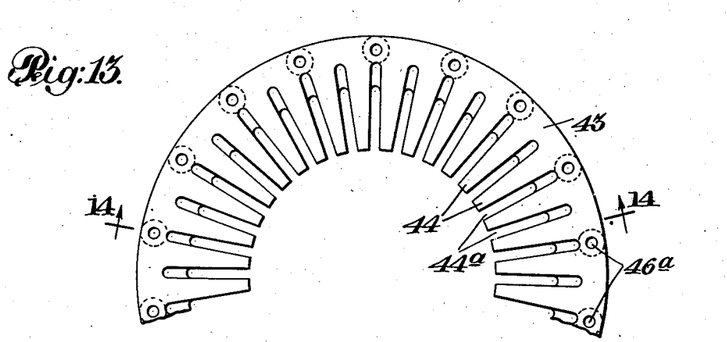
Fig. 13 is a partial plan view of the inlet valve keeper.
Figure 14:
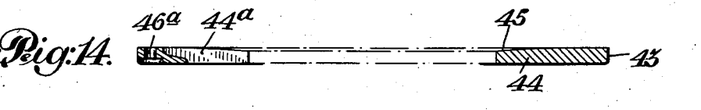
Fig. 14 is a section thereof on line 14—14 of Fig. 13.

The portions of the lower face of the inlet valve seat surrounding the inlet ports 34 form the seating surface for the inlet valve strips or plates which are formed like the discharge valve strips or plates and are positioned in a similar manner by means of a spacer ring 40, shown in detail in Fig. 12, and provided with inwardly extending fingers 41 forming spaces 42 between them to receive and position the inlet valve strips radially and in proper relation to the inlet ports 34. This spacer is formed of thin metal of less thickness than the plate valves and is held in place by an intake valve keeper 43 provided with inwardly extending fingers 44 in line with the inlet ports 34 and having their upper surfaces 45 curved downwardly approximately to the elastic curve which the strips will assume when in open position. The keeper plate 43 and spacer ring 40 for the inlet valves are held in place by bolts 46 which pass through registering apertures 46a in the keeper and spacer, and as previously described with reference to the discharge valves the tightening of these screws will effectively clamp the outer ends of the inlet valves to the lower face of the inlet valve seat and hold the valves normally in closed position. The inlet plate valves are indicated at 47 in Figs. 5 and 30.

Figure 30:
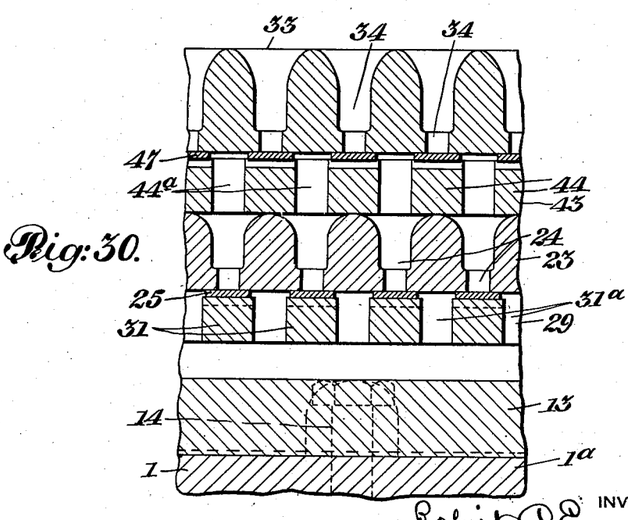
Fig. 30 is an enlarged sectional view of portions of the assembled parts of the valve mechanism, taken with the top cover removed, on line 30—30 of Fig. 5, transversely of a plurality of the radially disposed inlet and discharge plate valves.

By reference to Fig. 30 it will be noted that the inlet ports 34 and inlet valves 47 are in line vertically with the fingers 44 of the inlet valve keeper, the gas admitted through the inlet valves passing downward through the spaces 44a between the fingers 44 while the discharge ports 24 and discharge valves 25 and the fingers 31 of the discharge valve keeper are in vertical alignment with the spaces 44a above referred to, and the gas discharged through the discharge ports 24 when the valves 25 are opened, pass downward through the spaces 31a between the fingers 31 of the discharge valve keeper into the annular channel in the discharge valve support, from which it passes as previously described through the ports 21, annular passage 11, and main discharge passage 12.

Only a single set of cap screws 46 are required to clamp the inlet valve keeper, inasmuch as the pressure is lower and acts against a portion of less area than in the case of the discharge keeper, in respect of which I find it desirable to use a second series of screws, previously described and indicated at 30c to prevent bowing of the keeper plate. Such bowing of the discharge valve keeper would result in the loosening of the valve strips and the consequent failure to operate in the normal manner, and would probably also result in breakage of the strips. As before indicated, with reference to Fig. 30, it will be noted that the axes of the inlet ports and the corresponding inlet fingers lie in radial planes midway between the axes of the discharge ports and discharge valve keeper fingers, there being an equal number of discharge and inlet ports and valves. Thus, the recessed notches between the inlet keeper fingers lie directly over the discharge ports and serve as passageways communicating therewith.

It will also be noted that while the discharge valve strips or plates are clamped at their inner ends, the inlet valve strips are clamped at their outer ends, as clearly shown in Fig. 5.

Figure 1:
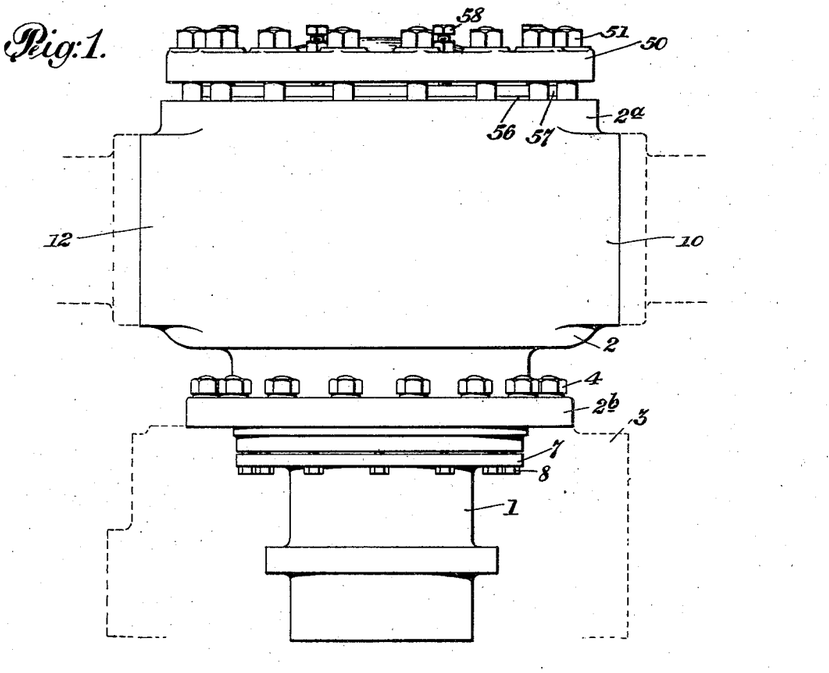
Fig. 1 represents a side elevation of the upper portion of a compressor cylinder and valve casing, containing an embodiment of my invention.
Figure 2:
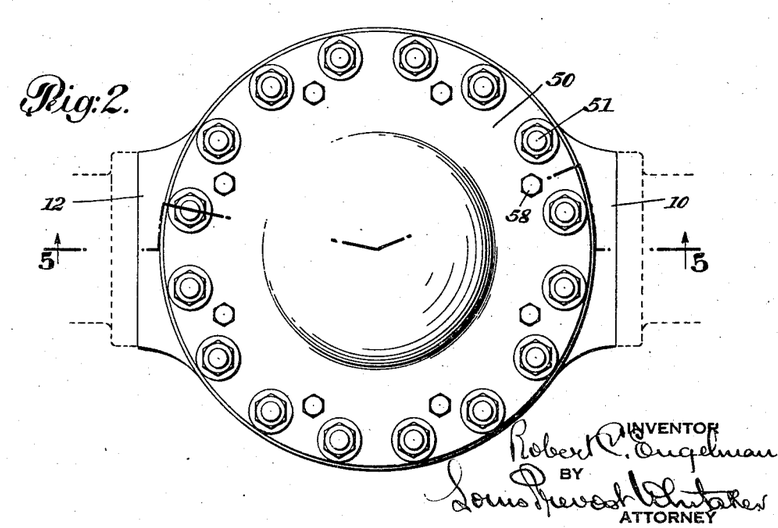
Fig. 2 is a top plan view of the same.
Figure 3:
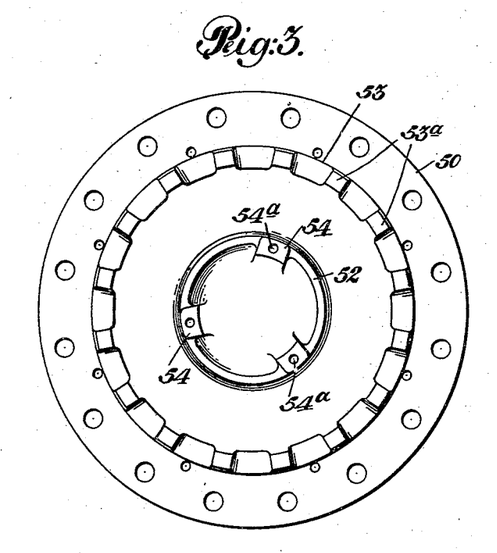
Fig. 3 is a bottom plan view drawn to the same scale as Figs. 1 and 2 of the top cover.
Figure 4:
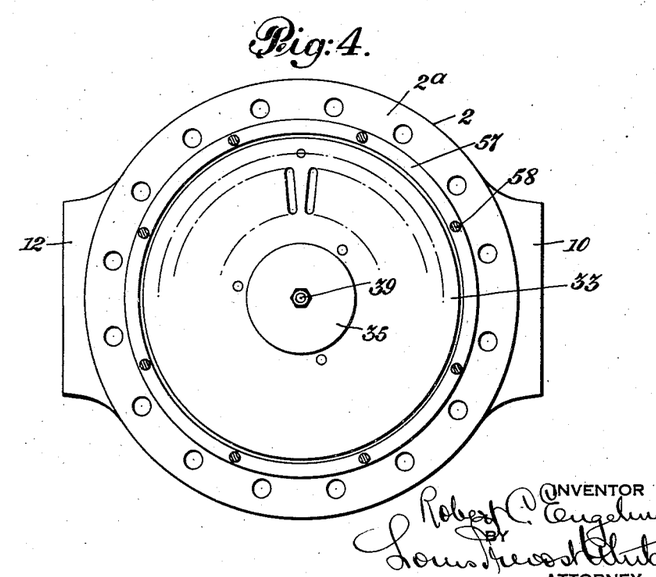
Fig. 4 is a top plan view of the apparatus with the top cover removed.

The entire valve assembly is held against the discharge valve support 13 by the top cover 50, which is secured to the water jacket by an annular series of cap screws or threaded bolts and nuts, indicated at 51. Fig. 3 shows a bottom plan view of the top cover 50 removed. This top cover is provided with two downwardly extending annular ribs, the inner of which is indicated at 52, and the outer rib at 53, which insure the requisite strength inasmuch as the compressor may be operated with inlet pressures of several hundred pounds per square inch. An annular series of lugs 54, in this instance three in number, are provided with threaded apertures in their lower ends, indicated at 54a, to receive cap screws 55 (see Fig. 5) to secure the top cover to the inlet valve support 33 and the outer rib or flange 53 has a plurality of similar depending lugs, indicated at 53a, which engage the upper face of the inlet valve seat adjacent to the periphery thereof. The outer cylindrical surface of the cover, that is to say the outer cylindrical surface of the downwardly extending flange 53 thereof, engages a bore at the upper end of the water jacket 2, the mouth of the bore being coned outwardly to form a packing recess which receives a corresponding packing 56 wedge-shaped in cross section (see Fig. 5) which is compressed by means of an annular follower 57, the upper face of which is engaged by an annular series of cap screws 58, each of which is preferably provided with a set nut 58a.

It will be observed that the interior of the cover communicates through recesses 53b between the studs 53a with the annular inlet passage 9 and main inlet passage 10. The space within the cover 50 also is in direct communication with the inlet ports 34, as will be readily understood.

The operation of the valve mechanism will be readily understood from the foregoing description. As the piston begins its downward stroke the small residue of fluid in the clearance surrounding the clearance plug 38 will expand into the cylinder with resultant decrease of pressure. The discharge valve strips are held closed by the greater pressure of fluid in the discharge passage 11 and main discharge passage 12. When the piston has travelled a short distance downwardly the fluid pressure in the cylinder will have fallen to slightly less than the pressure in the main inlet and inlet passages in the top cover communicating therewith, and with the inlet valve ports, whereupon the inlet valves are opened flexing downwardly at their inner ends toward the fingers 44 of the inlet valve keeper, permitting fluid to flow from the inlet chamber in the top cover radially inward through the inlet ports and along the strip or plate valves, into the annular chamber surrounding the volume clearance plug 38, and thence downward into the cylinder as the piston continues its downward stroke. When the piston reaches the end of its stroke and dwells for an instant, the pressure in the cylinder will be that of the suction, and the resilient energy of the inlet strips will restore them to their seated or closed positions, thus closing the inlet ports 34.

At the beginning of the upward stroke of the piston the fluid in the cylinder is compressed holding the inlet valve strips closed and causing the outer ends of the discharge valve strips to flex downwardly toward the fingers 31 of the discharge valve keeper and open the discharge ports 24. As the upward stroke of the piston proceeds the compressed fluid in the cylinder is forced radially outward through the ports 24 in the discharge valve seat along the discharge valve strips, thence down through the ports 21 in the discharge valve support and into the annular discharge chamber 11 in the water jacket to the main discharge passage 12, compressing the fluid and delivering it to the discharge line. When the piston reaches the top of the stroke the resilient energy of the discharge strips restores them to closed position.

It will be noted that, by virtue of the novel construction of the valve mechanism the fluid moves radially inwardly along the inlet valve strips during the suction stroke, and then radially outwardly along the discharge valve strips on the compression stroke. This manner of directing the fluid flow insures a maximum efficiency of the valve mechanism, since turbulence and friction of the fluid will be reduced to a minimum. The arrangement of the valve ports and passageways provides large areas for the passage of the gas in relation to the cylinder volume or capacity, resulting in moderate velocity being imparted to the fluid at any point and minimizing shocks due to changes in velocity at critical points of the cycle which might otherwise occur, and thus insuring long life of the valve strips and plates and their seats.

Figure 32:
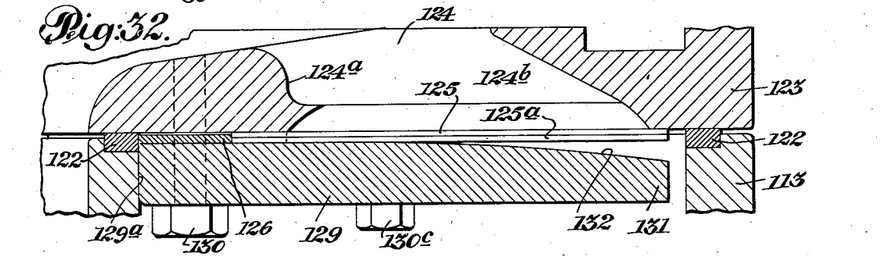
Fig. 32 is a view similar to Fig. 31, showing a modified form of plate valve.
Figure 33:
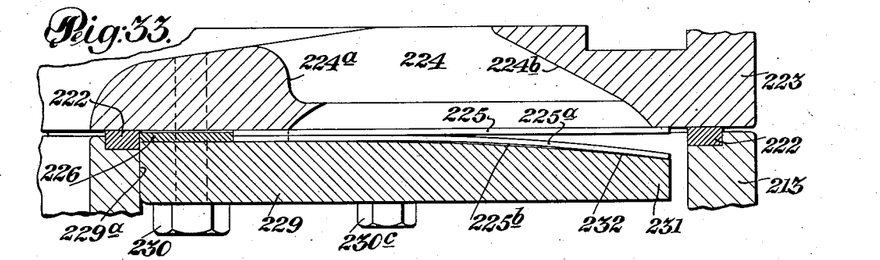
Fig. 33 is a view similar to Fig. 31, showing another modified form of plate valve.
Figure 34:
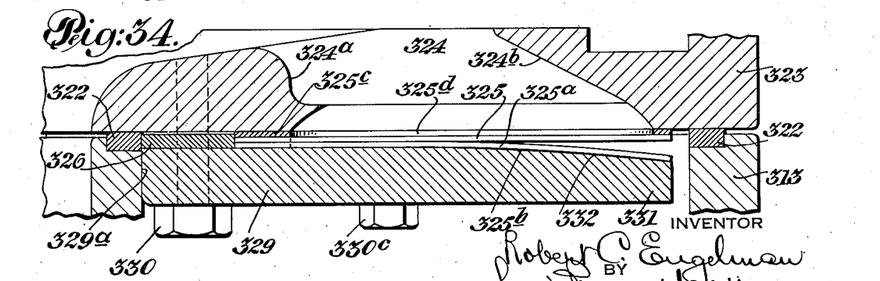
Fig. 34 is a view similar to Fig. 31 showing a further modified form of plate valve.

In carrying my invention into effect, I may somewhat modify the construction of the plate valve and I have illustrated in Figs. 32, 33 and 34, certain modifications therein which have been found to be of considerable value and advantage. However, it may be stated that a valve comprising a single strip having the necessary elastic properties, and range of movement to provide suitable openings, while entirely practical and satisfactory in some cases, may in other cases vibrate at some higher harmonic of the compressor speed, resulting in undesirable pulsation, excessive oil, unsatisfactory seating, high vibratory stresses and restricted flow. It is not practical to increase the thickness of the single strip valve as this is precluded by high stresses induced by the required amount of flexure thereof.

In some instances as illustrated in Fig. 32, in which parts corresponding with those illustrated in the previous figures are given the same reference numerals with the addition of 100, I may employ, in connection with each port, two valve strips as indicated at 125 and 125a, one above the other and positioned and clamped adjacent to one end of the valve port 124, in the manner previously described, by means of the keeper indicated at 129 and the spacer ring 126, the latter being of a thickness slightly less than the combined thicknesses of the two valve plates 125 and 125a. The two strip valves when used together in this manner may have a natural frequency of vibration very nearly that of the normal operating speed of the compressor with relatively slight increase in resistance to opening as compared with a single strip and no greater stress for any given flexure than a single strip.

Referring to Fig. 33, in which the parts corresponding with those previously described are given the same reference numerals with the addition of 200, I have shown a modification of the construction illustrated in Fig. 32, in which the lower strip 225a lies upon the upper surface 232 of one of the fingers 231 of the keeper plate 229, but has a normal curvature slightly greater than that of the upper surface 232 of said finger. In this instance this second strip 225a acts as a guard for the main or upper strip valve 225, the guard strip being supported by the keeper adjacent to its ends, intermediate portions being spaced from the keeper, as indicated at 225b due to difference in curvature. It will be seen that since the curvature of the guard is greater than that of the keeper the upper face of which is, as previously stated, substantially the elastic curve of the valve strip in the wide open position, the normal curvature of the guard is greater than that of the valve strip at any point in the opening movement of the valve strip. Therefore, as the valve strip opens, the guard strip 225a is caused to flex progressively from its clamped end to its free end, absorbing a portion of the velocity energy of the valve strip, preventing the velocity from attaining an excessive value and minimizing or cushioning the impact against the keeper.

In Fig. 34, in which the parts corresponding with those originally described are given the same reference numerals with the addition of 300, I have shown three strips clamped between the keeper 329 and the valve seat 323, the spacer ring 326 being of slightly less thickness than the combined thicknesses of the three plates as shown. In this instance the upper plate, indicated at 325c constitutes in effect a removable valve seat and does not vibrate. It is provided with an aperture, indicated at 325d of the same size as the adjacent aperture of the port 324. The intermediate plate 325 is the plate valve proper which operates in the manner previously described, by flexing away from and toward the auxiliary seat 325c, and in this instance the third plate member 325a is the guard plate corresponding with the guard plate 225a previously described with reference to Fig. 33, and coacts in the same manner with the plate member 325 as previously described with reference to that figure.

Figure 31:
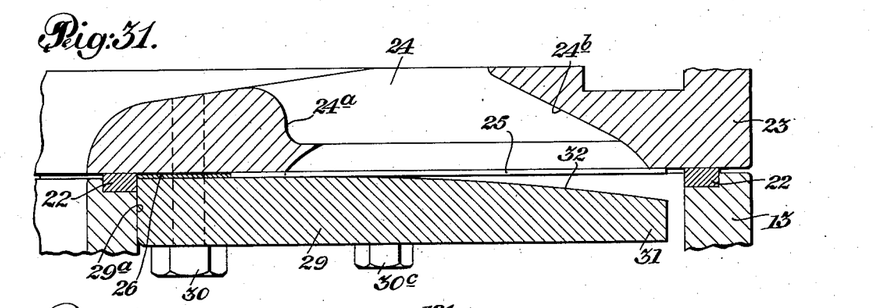
Fig. 31 is an enlarged sectional view showing one of the discharge ports, its plate valve and the adjacent parts.

It will be entirely obvious that the removable seat plate interposed between the plate valve could be used in any of the previously described constructions illustrated, for example in Figs. 31, 32 and 33, that is to say whether the plate valve is of the single or double plate type and whether or not it is provided with a guard plate as shown in Figs. 33 and 34. By using these removable seat plates the necessity for remachining or replacing the main seat plate is obviated, and whenever a removable seat plate becomes worn it may be readily removed and replaced with a minimum of trouble and expense. This construction is particularly advantageous in cases where, by misadjustment or otherwise, one or more seats wear more rapidly than the rest, since it is only necessary to replace the worn strips, whereas without these removable seat plates it might be necessary to reface an entire valve seat plate.

In describing the modifications of the plate valve structures with reference to Figs. 32, 33 and 34, I have, for convenience illustrated them in connection with discharge valves and their adjacent parts. It will be understood, however, that the constructions are equally applicable to the inlet valves.

As previously indicated, in case of breakage of the plate or strip valves, it is only necessary to release the bolts or screws 51, holding the top cover in place, when the entire top cover together with the inlet and discharge valve assemblies may be withdrawn from the top or valve casing portion of the water jacket for purposes of repair, and by loosening one or other or both of the keeper plates, the broken plate valves can be removed and replaced, the keeper plates tightened, and the entire cover and valve assembly replaced with a minimum loss of time. This, as will be readily understood, is a very important feature, especially where the compressors are used in connection with natural gas transmission lines, where any material delay for repairs might mean a serious interruption of service.

What I claim and desire to secure by Letters Patent is:

1. In a valve mechanism for a compressor, the combination with a cylinder and piston of superimposed valve seat members, inlet and discharge valves each provided with a circular series of radially disposed ports, separately formed radially disposed strip valves normally closing said ports, each of said valve seat members being provided with separate spacing and positioning means of less thickness than the valve strips having recesses for engaging the valve strips at one end, and a keeper means for directly engaging all of the separate strip valves of each seat at one end of each strip and clamping them between said keeper means and the seat member, in relation to the ports of said seat as determined by the said positioning means.

2. In a valve mechanism for a compressor, the combination with a cylinder and piston of superimposed valve seat members, inlet and discharge valves each provided with a circular series of radially disposed ports, a separate and independent radially disposed strip valve normally closing each of said ports, one of said seat members being provided with spacing and positioning means of less thickness than the strip valves, having recesses for engaging the outer ends of the separate strip valves thereof, and the other seat member provided with similar spacing and positioning means engaging the separate strip valves thereof at their inner ends, and each valve seat member being provided with keeper means for directly engaging all the separate valve strips thereof and clamping them between it and the seat member at the ends engaged by the spacing and positioning means.

3. In a valve mechanism for a compressor, the combination with a cylinder and piston of superimposed valve seat members, inlet and discharge valves each provided with a circular series of radially disposed ports, separate and independent radially disposed strip valves normally closing said ports, one of said seat members being provided with spacing and positioning means of less thickness than the strip valves, having recesses for engaging the outer ends of each of the separate strip valves thereof, and the other seat member provided with similar spacing and positioning means engaging the strip valves thereof at their inner ends, and each valve seat member being provided with keeper means for directly engaging all the valve strips thereof at the ends engaged by the spacing and positioning means and clamping said ends of the valves between said keeper means and said respective seat members, said seat members being removably supported with respect to said cylinder to provide for removal thereof in assembled relation for repair.

4. In a valve mechanism for a compressor, the combination with a cylinder and piston of superimposed valve seat members, inlet and discharge valves each provided with a circular series of radially disposed ports, separate and independent radially disposed strip valves normally closing said ports, one of said seat members being provided with spacing and positioning means of less thickness than the strip valves, having recesses for engaging the outer ends of the separate strip valves thereof, and the other seat member provided with similar spacing and positioning means engaging the separate strip valves thereof at their inner ends, and each valve seat member being provided with keeper means for directly engaging all of the valve strips thereof at the ends engaged by the spacing and positioning means to said respective seat members and clamping them between said keeper means and their respective seat members, said seat members being removably supported with respect to said cylinder, and means connecting said seat members for holding them in fixed relation when removed from their relation to the cylinder, and detachable means for securing said seat members with respect to the cylinder, permitting the joint removal thereof.

5. In valve mechanism for a compressor, the combination with a cylinder and piston, said cylinder being provided with a valve casing at its closed end, and with inlet and discharge passages, a discharge valve seat member provided with a circular series of radial ports for communicating with said discharge passages, strip valves normally closing said ports, a spacing and positioning ring of less thickness than said valves having recesses engaging the inner ends of said valves, and a keeper plate secured to said seat member and clamping the inner ends of said valves in positioned relation thereto, an inlet valve seat member superimposed upon the discharge valve seat member, provided with a circular series of radial ports for communicating with said inlet passages, strip valves normally closing said ports, a spacing and positioning ring of less thickness than said valves having recesses engaging the outer ends of said valves, and a keeper ring secured to said seat member and clamping the outer ends of the strip valves thereof in positioned relation thereto, said discharge valve seat member having a central aperture communicating with the cylinder and with the inlet and outlet ports when the valves thereof are in open position, whereby the fluid to be compressed is admitted radially along the inlet valves toward the axis of the cylinder and is discharged radially along the discharge valves away from the axis of the cylinder.

6. In a valve mechanism for a compressor, the combination with a cylinder and piston, said cylinder being provided with a valve casing at its closed end, and with inlet and discharge passages, a discharge valve seat member provided with a circular series of radial ports for communicating with said discharge passages, strip valves normally closing said ports, a spacing and positioning ring of less thickness than said valves having recesses engaging the inner ends of said valves, and a keeper plate secured to said seat member and clamping the inner ends of said valves in positioned relation thereto, an inlet valve seat member superimposed upon the discharge valve seat member, provided with a circular series of radial ports for communicating with said inlet passages, strip valves normally closing said ports, a spacing and positioning ring of less thickness than said valves having recesses engaging the outer ends of said valves, and a keeper ring secured to said seat member and clamping the outer ends of the strip valves thereof in positioned relation thereto, said discharge valve seat member having a central aperture communicating with the cylinder and with the inlet and outlet ports when the valves thereof are in open position, means for removably supporting said valve seat members in said casing, detachable means for securing said members in operative relation with the cylinder, and means connecting said seat members for joint removal to effect repair or replacement of either inlet or discharge valves.

7. In a valve mechanism for a compressor, the combination with a cylinder and piston, said cylinder being provided with a valve casing at its closed end, and with inlet and discharge passages, a discharge valve seat member provided with a circular series of radial ports for communicating with said discharge passages, strip valves normally closing said ports, a spacing and positioning ring of less thickness than said valves having recesses engaging the inner ends of said valves, and a keeper plate secured to said seat member and clamping the inner ends of said valves in positioned relation thereto, an inlet valve seat member superimposed upon the discharge valve seat member, provided with a circular series of radial ports for communicating with said inlet passages, strip valves normally closing said ports, a spacing and positioning ring of less thickness than said valves having recesses engaging the outer ends of said valves, and a keeper ring secured to said seat member and clamping the outer ends of the strip valves thereof in positioned relation thereto, said discharge valve seat member having a central aperture communicating with the cylinder and with the inlet and outlet ports when the valves thereof are in open position, means for removably supporting said valve seat members in said casing, means for connecting said valve seat members for joint removal, and a top cover detachably secured to said casing and having portions engaging one of said valve seat members to secure both of said valve seat members in operative position.

8. In a valve mechanism for a compressor, the combination with a cylinder and piston, said cylinder being provided with a valve casing at its closed end, and with inlet and discharge passages, a discharge valve seat member provided with a circular series of radial ports for communicating with said discharge passages, strip valves normally closing said ports, a spacing and positioning ring of less thickness than said valves having recesses engaging the inner ends of said valves, and a keeper plate secured to said seat member and clamping the inner ends of said valves in positioned relation thereto, an inlet valve seat member superimposed upon the discharge valve seat member, provided with a circular series of radial ports for communicating with said inlet passages, strip valves normally closing said ports, a spacing and positioning ring of less thickness than said valves having recesses engaging the outer ends of said valves, and a keeper ring secured to said seat member and clamping the outer ends of the strip valves thereof in positioned relation thereto, said discharge valve seat member having a central aperture communicating with the cylinder and with the inlet and outlet ports when the valves thereof are in open position, a discharge valve seat support in said casing for engaging said discharge valve seat member and removably supporting both valve seat members, a top cover for said casing detachably secured thereto and provided with means for engaging the inlet valve seat member and clamping both valve seat members between it and the discharge valve seat support.

9. In a valve mechanism for a compressor, the combination with a cylinder and piston, said cylinder being provided with a valve casing at its closed end, and with inlet and discharge passages, a discharge valve seat member provided with a circular series of radial ports for communicating with said discharge passages, strip valves normally closing said ports, a spacing and positioning ring of less thickness than said valves having recesses engaging the inner ends of said valves, and a keeper plate secured to said seat member and clamping the inner ends of said valves in positioned relation thereto, an inlet valve seat member superimposed upon the discharge valve seat member, provided with a circular series of radial ports for communicating with said inlet passages, strip valves normally closing said ports, a spacing and positioning ring of less thickness than said valves having recesses engaging the outer ends of said valves, and a keeper ring secured to said seat member and clamping the outer ends of the strip valves thereof in positioned relation thereto, said discharge valve seat member having a central aperture communicating with the cylinder and with the inlet and outlet ports when the valves thereof are in open position, a discharge valve seat support in said casing for engaging said discharge valve seat member and removably supporting both valve seat members, a top cover for said casing detachably secured thereto and provided with means for engaging the inlet valve seat member and clamping both valve seat members between it and the discharge valve seat support, means connecting said valve seat members together for joint removal with their valves and connected parts, and means connecting said valve seat members with said top cover for joint removal therewith.

10. In valve mechanism for a compressor, the combination with a cylinder and a piston therein, of a water jacket for the cylinder providing a valve casing, and inlet and discharge passages, an annular discharge valve seat support secured to the end of the cylinder and surrounding the piston head and provided with apertures communicating with the discharge passages, an annular discharge valve seat member, supported by said support and provided with a circular series of radial ports, strip valves normally closing said ports, a spacing and positioning ring of less thickness than the strip valves, having a recess for engaging the inner ends of said valves, a keeper ring for clamping the inner ends of said valves to the seat member, having inwardly extending fingers provided with curved upper surfaces, below the valve strips, a circular inlet valve seat member provided with radial inlet ports, strip valves normally closing the same, a similar spacing and positioning ring engaging the outer ends of the inlet valves, and a keeper plate clamping the outer ends of said inlet valves to the inlet valve seat member, a top cover detachably secured to the water jacket, and having portions engaging the inlet valve seat member, and spaces within the top cover for connecting the inlet valve ports with said inlet passages.

11. In valve mechanism for a compressor, the combination with a cylinder and a piston therein, of a water jacket for the cylinder providing a valve casing, and inlet and discharge passages, an annular discharge valve seat support secured to the end of the cylinder and surrounding the piston head and provided with apertures communicating with the discharge passages, an annular discharge valve seat member, supported by said support and provided with a circular series of radial ports, strip valves normally closing said ports, a spacing and positioning ring of less thickness than the strip valves, having a recess for engaging the inner ends of said valves, a keeper ring for clamping the inner ends of said valves to the seat member, having inwardly extending fingers provided with curved upper surfaces, below the valve strips, a circular inlet valve seat member provided with radial inlet ports, strip valves normally closing the same, a similar spacing and positioning ring engaging the outer ends of the inlet valves, and a keeper plate clamping the outer ends of said inlet valves to the inlet valve seat member, a top cover detachably secured to the water jacket, and having portions engaging the inlet valve seat member, and spaces within the top cover for connecting the inlet valve ports with said inlet passages, said inlet valve seat member being supported upon and connected with the discharge valve seat member, and said top cover being secured to the inlet valve seat member so that the said cover and both valve seat members and connected parts may be removed by removing the detachable securing means of the top cover, for repair of the valve mechanism or replacement of valve strips.

12. In a valve mechanism for compressors, a valve unit comprising a valve seat member provided with a circular series of radial ports, separate and independent strip valves for normally closing said ports, a spacer ring of less thickness than said strip valves, provided with radial recesses for engaging said separate valves at one end thereof and positioning them with respect to said ports, means for securing said spacer ring against movement with respect to the seat member, a keeper ring for engaging the ends, all of said separate valves positioned by said spacer ring and provided with radial fingers extending below said valves and ports and having their upper faces curved substantially in the normal curvature of said strip valves when in open position, and means for securing said keeper ring and seat member together to clamp the positioned ends of said separate valves between them.

13. In a valve mechanism for compressors, a valve unit comprising a valve seat member provided with a circular series of radial ports, a plurality of separate and independent superposed strip valves for normally closing each of said ports, a spacing and positioning ring engaging a face of said seat member and provided with radial recesses to engage each of the separate plural valves at one end thereof, a keeper plate for the ends of said valves engaged by the spacing and positioning ring against said seat member and provided with radial fingers below said ports having their upper faces curved in substantially the curvature of the valve when in open position, and the plural strip valves for each port having a combined thickness slightly greater than said spacer ring, and means for clamping the keeper to said seat member and means for holding the spacer ring against lateral movement with respect to the seat member.

14. In a valve mechanism for compressors, a valve unit comprising a valve seat member provided with a circular series of radial ports, a spacing and positioning ring engaging a face of said seat member and provided with radial recesses to engage the valves at one end thereof, a keeper plate for clamping the ends of said valves engaged by the spacing and positioning ring against said seat member and provided with radial fingers below said ports having their upper faces curved in substantially the curvature of the valve when in open position, a plurality of separate and independent elastic metal strip valves for each of said ports in positioned engagement with said spacer ring, and the valves for each port having a combined thickness slightly greater than said spacer ring, and means for clamping the keeper to said seat member and holding the spacer ring against lateral movement with respect thereto, the valve strips adjacent said ports normally closing the same and the strips adjacent to said keeper fingers engaging the latter at their free ends, and having a normal curvature greater than that of the upper faces of the said fingers to cushion the action of the port closing strips.

15. In a valve mechanism for compressors, a valve unit comprising a valve seat member provided with a circular series of radial ports, a spacing and positioning ring engaging a face of said seat member and provided with radial recesses to engage the valves at one end thereof, a keeper plate for clamping the ends of said valves engaged by the spacing and positioning ring against said seat member and provided with radial fingers below said ports having their upper faces curved in substantially the curvature of the valve when in open position, a plurality of separate and independent elastic metal strip valves for each of said ports in positioning engagement with said spacer ring, and having a combined thickness slightly greater than said spacer ring, and means for clamping the keeper to said seat member and holding the spacer ring against lateral movement with respect thereto, the strips adjacent to said seat member being provided with apertures registering with said ports and forming removable valve seats.

16. In a valve mechanism for compressors, a valve unit comprising a valve seat member provided with a circular series of radial ports, a spacing and positioning ring engaging a face of said seat member and provided with radial recesses to engage the valves at one end thereof, a keeper plate for clamping and positioning said valves with respect to said ports, the ends of said valves engaged by the spacing and positioning ring against said seat member and provided with radial fingers below said ports having their upper faces curved in substantially the curvature of the valve when in open position, a plurality of elastic metal strip valves for each of said ports in positioning engagement with said spacer ring, and having a combined thickness slightly greater than said spacer ring, and means for clamping the keeper to said seat member and holding the spacer ring against lateral movement with respect thereto, one of the strips for each port, adjacent to said seat member, having an aperture registering with the port and constituting a valve seat, another of said strips forming a valve and normally closing said aperture and port, and another of said strips engaging the adjacent finger of the keeper at its outer end and having a normal curvature greater than that of the adjacent curved face of said finger.

17. In a strip valve mechanism, the combination of a valve seat member provided with a valve port therethrough and a valve seat on one surface thereof, a keeper member, a strip valve normally engaging said valve seat and closing said port, having one end clamped between said keeper and valve seat, and a spacer member of less thickness than the strip valve, located between and held from lateral movement in respect to said seat member and keeper member, and provided with a positioning recess engaging the clamped end portion of said valve and positioning it with respect to said port and valve seat.

18. In a strip valve mechanism, the combination with a valve seat member provided with a valve port therethrough and a valve seat surrounding said port on one face of said seat member, a strip valve normally engaging said valve seat and closing said port, a keeper member having portions for clamping one end of said valve strip between it and the valve seat member, a spacer member of less thickness than the strip valve located between the keeper member and valve seat member, and provided with a positioning recess for engaging the clamped portion of the strip valve, and means for forcing the keeper member toward the plate member and holding the spacer member against lateral movement with respect to said valve seat member.

19. In a strip valve mechanism, the combination with a valve seat member provided with a valve port therethrough and a valve seat surrounding said port on one face of said seat member, a strip valve normally engaging said valve seat and closing said port, a keeper member having portions for clamping one end of said valve strip between it and the valve member, a spacer member of less thickness than the strip valve located between the keeper member and valve seat member, said valve seat member, spacer member and keeper member being provided with registering apertures, and threaded clamping means engaging said apertures to clamp said strip valve in the position determined by the positioning recess therein.

20. In a strip valve mechanism, the combination with a valve seat member provided with an elongated port, a spacing and positioning member provided with a recess to engage one end of a strip valve and position it with respect to said port, a keeper for clamping the positioned end of the strip valve, and a finger extending beneath said port and having the face adjacent thereto curved substantially in the curvature of a strip valve when in open position, means for clamping the keeper and seat member together and holding the spacing and positioning member against lateral movement with respect thereto, and a plurality of strips of elastic metal engaging said recess in the spacing and positioning member and having a combined thickness slightly greater than the spacing and positioning member.

21. In a strip valve mechanism, the combination with a valve seat member provided with an elongated port, a spacing and positioning member provided with a recess to engage one end of a strip valve and position it with respect to said port, a keeper for clamping the positioned end of the strip valve, and a finger extending beneath said port and having the face adjacent thereto curved substantially in the curvature of a strip valve when in open position, means for clamping the keeper and seat member together and holding the spacing and positioning member against lateral movement with respect thereto, and a plurality of strips of elastic metal engaging said recess in the spacing and positioning member and having a combined thickness slightly greater than the spacing and positioning member, one of said strips normally closing said port and the other engaging said finger at its outer end, and having a normal curvature greater than the adjacent curved faces of said finger.

22. In a strip valve mechanism, the combination with a valve seat member provided with an elongated port, a spacing and positioning member provided with a recess to engage one end of a strip valve, and position it with respect to said port, a keeper for clamping the positioned end of the strip valve, and a finger extending beneath said port and having the face adjacent thereto curved substantially in the curvature of a strip valve when in open position, means for clamping the keeper and seat member together and holding the spacing and positioning member against lateral movement with respect thereto, and a plurality of strips of elastic metal engaging said recess in the spacing and positioning member and having a combined thickness slightly greater than the spacing and positioning member, the strip adjacent to said seat member having an aperture registering with said port, and the adjacent strip normally closing said aperture and port.

23. In a strip valve mechanism, the combination with a valve seat member provided with an elongated port, a spacing and positioning member provided with a recess to engage one end of a strip valve, and position it with respect to said port, a keeper for clamping the positioned end of the strip valve, and a finger extending beneath said port and having the face adjacent thereto curved substantially in the curvature of a strip valve when in open position, means for clamping the keeper and seat member together and holding the spacing and positioning member against lateral movement with respect thereto, and a plurality of strips of elastic metal engaging said recess in the spacing and positioning member and having a combined thickness slightly greater than the spacing and positioning member, the strip adjacent to said seat member having an aperture registering with said port, and the adjacent strip normally closing said aperture and port, and an adjacent strip engaging said finger at its outer end and having a normal curvature greater than that of the adjacent face of said finger.

ROBERT C. ENGELMAN.